United States Patent [19]
Kujath

[11] Patent Number: 5,988,111
[45] Date of Patent: Nov. 23, 1999

[54] SEED PLATFORM

[76] Inventor: Erik Kujath, 216 20th St. SE., Rochester, Minn. 55904

[21] Appl. No.: 09/074,086

[22] Filed: May 7, 1998

[51] Int. Cl.[6] .................................................. A01K 31/06
[52] U.S. Cl. ..................... 119/469; 119/57.8; 119/900; 119/432
[58] Field of Search ........................... 119/51.01, 432, 119/469, 462, 463, 52.2, 52.3, 57.8, 57.9, 900, 429, 467; D30/124

[56] References Cited

U.S. PATENT DOCUMENTS

| | | |
|---|---|---|
| 310,085 | 12/1884 | Schultzx . |
| 363,879 | 5/1887 | Armstrong . |
| 2,045,472 | 6/1936 | Kearney et al. . |
| 2,786,446 | 3/1957 | Newman . |
| 2,987,041 | 6/1961 | Bard . |
| 5,215,040 | 6/1993 | Lemley . |
| 5,711,247 | 1/1998 | Henshaw . |
| 5,758,596 | 6/1998 | Loiselle . |
| 5,826,539 | 10/1998 | Bloedorn . |

*Primary Examiner*—Peter M. Poon
*Assistant Examiner*—Yvonne R. Abbott

[57] ABSTRACT

A new seed platform for suspending below a bird feeder to catch feed that falls from the feeder. The inventive device includes a platform having a perimeter frame portion and a central portion. The central portion of the platform is generally flat and has a plurality of apertures of a predetermined size through it. A number of hooks are coupled to the upper face of frame portion of the platform. Each of the hooks has one end of an associated flexible member hooked thereon. The other end of each of the flexible members is attachable to the bottom of a bird feeder to suspend the platform below the bird feeder.

9 Claims, 2 Drawing Sheets

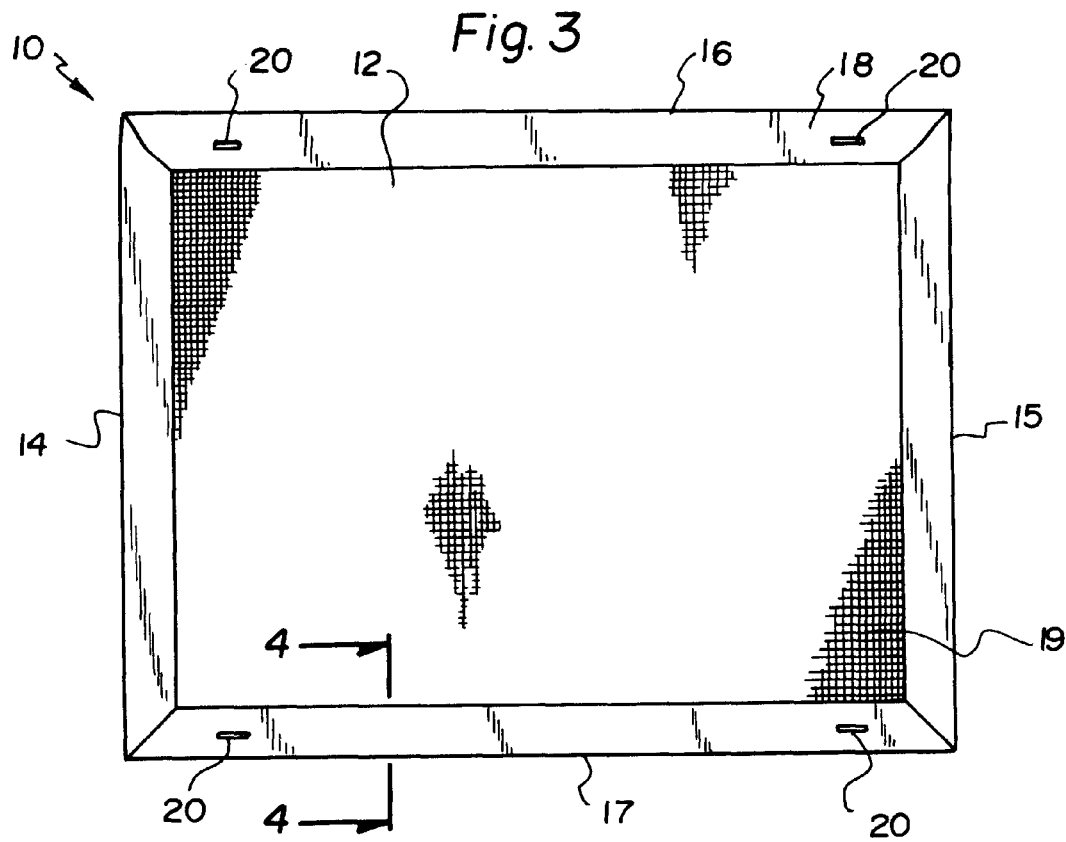
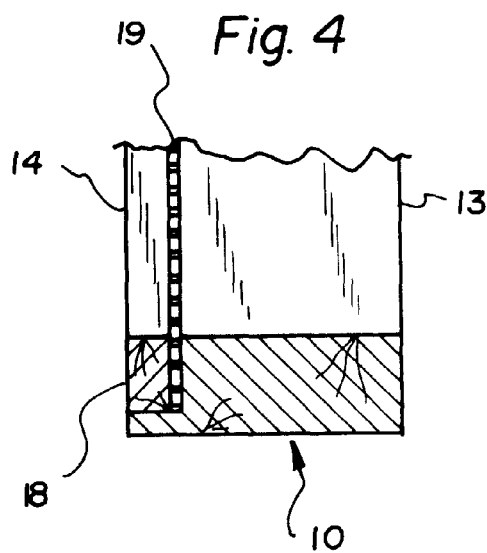

SEED PLATFORM

BACKGROUND OF THE INVENTION

1. Field of the Invention

The present invention relates to bird feed accessories and more particularly pertains to a new seed platform for suspending below a bird feeder to catch feed that falls from the feeder.

2. Description of the Prior Art

The use of bird feed accessories is known in the prior art. More specifically, bird feed accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art bird feed accessories include U.S. Pat. No. 4,955,319; U.S. Pat. No. 2,524,502; U.S. Pat. No. Des. 359,146; U.S. Pat. No. 4,046,108; U.S. Pat. No. Des. 376,964; and U.S. Pat. No. 4,215,652.

While these devices fulfill their respective, particular objectives and requirements, the aforementioned patents do not disclose a new seed platform. The inventive device includes a platform having a perimeter frame portion and a central portion. The central portion of the platform is generally flat and has a plurality of apertures of a predetermined size through it. A number of hooks are coupled to the upper face of frame portion of the platform. Each of the hooks has one end of an associated flexible member hooked thereon. The other end of each of the flexible members is attachable to the bottom of a bird feeder to suspend the platform below the bird feeder.

In these respects, the seed platform according to the present invention substantially departs from the conventional concepts and designs of the prior art, and in so doing provides an apparatus primarily developed for the purpose of suspending below a bird feeder to catch feed that falls from the feeder.

SUMMARY OF THE INVENTION

In view of the foregoing disadvantages inherent in the known types of bird feed accessories now present in the prior art, the present invention provides a new seed platform construction wherein the same can be utilized for suspending below a bird feeder to catch feed that falls from the feeder.

The general purpose of the present invention, which will be described subsequently in greater detail, is to provide a new seed platform apparatus and method which has many of the advantages of the bird feed accessories mentioned heretofore and many novel features that result in a new seed platform which is not anticipated, rendered obvious, suggested, or even implied by any of the prior art bird feed accessories, either alone or in any combination thereof.

To attain this, the present invention generally comprises a platform having a perimeter frame portion and a central portion. The central portion of the platform is generally flat and has a plurality of apertures of a predetermined size through it. A number of hooks are coupled to the upper face of frame portion of the platform. Each of the hooks has one end of an associated flexible member hooked thereon. The other end of each of the flexible members is attachable to the bottom of a bird feeder to suspend the platform below the bird feeder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new seed platform apparatus and method which has many of the advantages of the bird feed accessories mentioned heretofore and many novel features that result in a new seed platform which is not anticipated, rendered obvious, suggested, or even implied by any of the prior art bird feed accessories, either alone or in any combination thereof.

It is another object of the present invention to provide a new seed platform which may be easily and efficiently manufactured and marketed.

It is a further object of the present invention to provide a new seed platform which is of a durable and reliable construction.

An even further object of the present invention is to provide a new seed platform which is susceptible of a low cost of manufacture with regard to both materials and labor, and which accordingly is then susceptible of low prices of sale to the consuming public, thereby making such seed platform economically available to the buying public.

Still yet another object of the present invention is to provide a new seed platform which provides in the apparatuses and methods of the prior art some of the advantages thereof, while simultaneously overcoming some of the disadvantages normally associated therewith.

Still another object of the present invention is to provide a new seed platform for suspending below a bird feeder to catch feed that falls from the feeder.

Yet another object of the present invention is to provide a new seed platform which includes a platform having a perimeter frame portion and a central portion. The central portion of the platform is generally flat and has a plurality of apertures of a predetermined size through it. A number of hooks are coupled to the upper face of frame portion of the platform. Each of the hooks has one end of an associated flexible member hooked thereon. The other end of each of the flexible members is attachable to the bottom of a bird feeder to suspend the platform below the bird feeder.

Still yet another object of the present invention is to provide a new seed platform that saves bird feed from being wasted from it falling on the ground. With the seed platform, feed falling on the platform may be put back in the feeder of left on the platform so that it may be eaten by birds landing on the platform.

Even still another object of the present invention is to provide a new seed platform that helps keep the ground below a bird feeder clean by helping prevent feed from falling on the ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic top side view of the present invention.

FIG. 4 is a schematic partial sectional view of the present invention as seen from line 4—4 of FIG. 3.

DESCRIPTION OF THE PREFERRED EMBODIMENT

Figure 1:
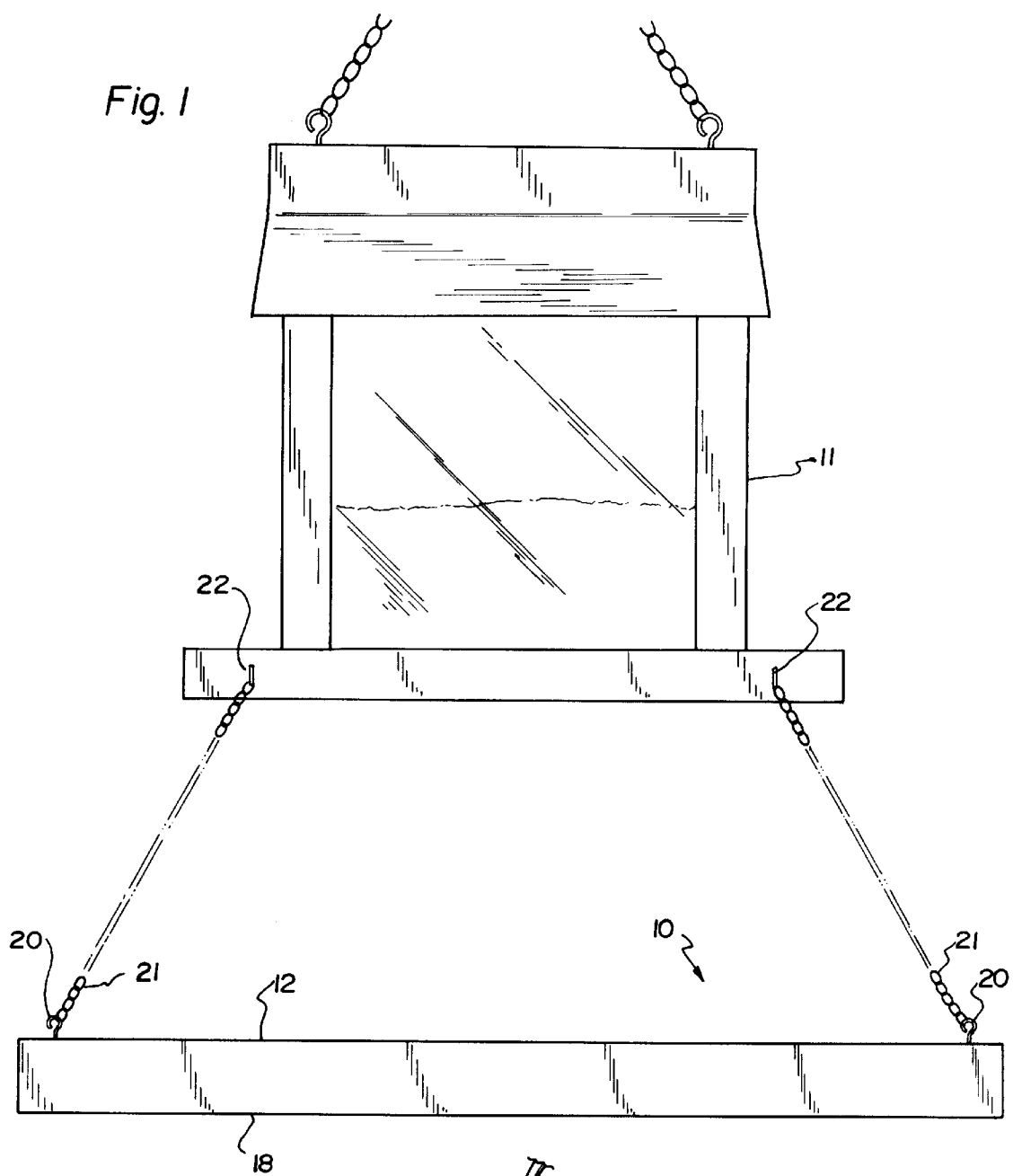
FIG. 1 is a schematic side view of a new seed platform suspended below a bird feeder according to the present invention.
Figure 2:
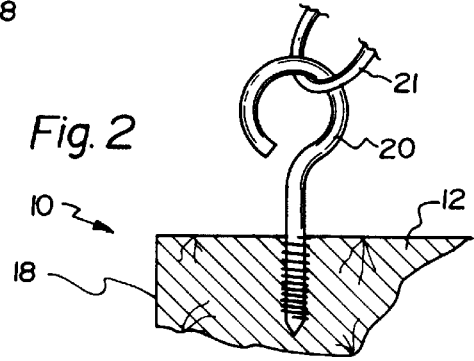
FIG. 2 is a schematic partial sectional view of a hook of the present invention.

With reference now to the drawings, and in particular to FIGS. 1 through 4 thereof, a new seed platform embodying the principles and concepts of the present invention and generally designated by the reference numeral 10 will be described.

As best illustrated in FIGS. 1 through 4, the seed platform 10 generally comprises a platform 10 having a perimeter frame portion 18 and a central portion 19. The central portion 19 of the platform 10 is generally flat and has a plurality of apertures of a predetermined size through it. A number of hooks 20 are coupled to the upper face 12 of frame 18 portion of the platform 10. Each of the hooks 20 has one end of an associated flexible member 21 hooked thereon. The other end of each of the flexible members 21 is attachable to the bottom of a bird feeder 11 to suspend the platform 10 below the bird feeder 11.

In use, the device 10 is designed for suspending below a bird feeder 11 for catching feed falling from the bird feeder 11. The platform 10 is preferably generally rectangular and has upper and lower faces 12,13, and an outer perimeter. The outer perimeter of the platform 10 includes a pair of ends 14,15 and a pair of sides 16,17 extending between the ends 14,15 of the platform 10. The platform 10 has a perimeter frame portion 18 and a central portion 19 with the perimeter frame portion 18 of the platform 10 extending along the outer perimeter of the platform 10. The central portion 19 of the platform 10 is generally flat and has a plurality of apertures of a predetermined size therethrough. The predetermined sized of the apertures is smaller than the size feed is provided in the bird feeder 11 such that feed may not pass through the apertures of the central portion 19. Preferably, the central portion 19 comprises a wire mesh.

A number of hooks 20 are coupled to the upper face 12 of frame portion 18 of the platform 10. Preferably a first pair of hooks 64 is located adjacent one of the sides 16 of the platform 10 and a second pair of hooks 66 is located adjacent the other side 17 of the platform 10. Ideally, one of the hooks 20 from each of the pairs of hooks 64 and 66 is positioned towards one of the ends 14 of the platform 10 and the other hook 20 from each of the pairs of hooks 64 and 66 is positioned towards the other end 15 of the platform 10.

A number of elongate flexible members, preferably chains, 21 are provided to suspend the platform 10 below a bird feeder. Each of the hooks 20 has one end of an associated chain 21 hooked thereon. The other of the end of each of the chains 21 is coupled to the bottom of a bird feeder 11 preferably by hooks 22 attached to the bottom of the bird feeder 11.

In the preferred embodiment, the platform 10 has a length defined between the ends 14,15 of the platform 10, a width defined between the sides 16,17 of the platform 10, and a thickness defined between the faces of the platform 10. Preferably, the width is greater than one half the length. Even more preferably, the width is greater than about 5 inches and the length is greater than about 10 inches. In an ideal illustrative embodiment, the width is about 15 inches and the length is about 20 inches. Preferably, the thickness is greater than 1 inch and ideally, the thickness is about 1½ inches. In use, the platform 10 is preferably suspended below a bird feeder 11 a distance greater than about 7 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for suspending below a bird feeder for catching feed falling from the bird feeder, said device comprising:

a planar platform having upper and lower faces, and an outer perimeter;

said outer perimeter of said platform including a pair of ends and a pair of sides extending between said ends of said platform;

said platform having a perimeter frame portion and a central portion, said perimeter frame portion of said platform extending along said outer perimeter of said platform;

said central portion of said platform being generally flat and having a plurality of apertures of a predetermined size therethrough;

a number of hooks being coupled to said upper face of frame portion of said platform, a first pair of said hooks being located adjacent one of said sides of said platform, a second pair of said hooks being located adjacent another of said sides of said platform;

a number of elongate flexible members each having a pair of opposite ends, each of said hooks having one end of an associated flexible member hooked thereon; and the other of said ends of each of said flexible members being couplable to the bottom of a bird feeder such that said platform is adapted for positioning below the bird feeder such that a bottom of the bird feeder is positioned above said central portion of said platform such that said platform is adapted to catch spilled bird seed from the bird feeder, said platform further being adapted for positioning in parallel spaced relationship below the bird feeder such that the platform is adapted for permitting birds to visibly perch on the platform to use the spilled bird seed that has fallen from the bird feeder.

2. The device of claim 1, wherein said platform is generally rectangular, wherein said platform has a length defined between said ends of said platform, wherein said platform has a width defined between said sides of said platform, and wherein said platform has a thickness defined between said faces of said platform.

3. The device of claim 2, wherein said width is greater than one half said length.

4. The device of claim 2, wherein said width is greater than about 5 inches, wherein said length is greater than about 10 inches, wherein said thickness is greater than 1 inch.

5. The device of claim 2, wherein said width is about 15 inches, wherein said length is about 20 inches, and wherein said thickness is about 1½ inches.

6. The device of claim 1, wherein said central portion comprises a wire mesh.

7. The device of claim 1, wherein one of said hooks from each of said pairs of hooks is positioned towards one of said ends of said platform, another of said hooks from each of said pairs of hooks is positioned towards another of said ends of said platform.

8. The device of claim 1, wherein said elongate flexible member comprises a length of chain.

9. In combination:

a bird feeder having a bottom, said bird feeder being adapted for suspending above a ground surface;

a platform being generally rectangular and having upper and lower faces, and an outer perimeter;

said outer perimeter of said platform including a pair of ends and a pair of sides extending between said ends of said platform;

said platform having a perimeter frame portion and a central portion, said perimeter frame portion of said platform extending along said outer perimeter of said platform;

said central portion of said platform being generally flat and having a plurality of apertures of a predetermined size therethrough, said predetermined sized being smaller than the size feed being provided in the bird feeder such that feed may not pass through said apertures of said central portion;

wherein said central portion comprises a wire mesh;

a number of hooks being coupled to said upper face of frame portion of said platform, said a first pair of said hooks being located adjacent one of said sides of said platform, a second pair of said hooks being located adjacent another of said sides of said platform;

one of said hooks from each of said pairs of hooks being positioned towards one of said ends of said platform, another of said hooks from each of said pairs of hooks being positioned towards another of said ends of said platform;

a number of elongate flexible member each having a pair of opposite ends, each of said hooks having one end of an associated flexible members hooked thereon, wherein said elongate flexible member comprises a length of chain;

the other of said ends of each of said flexible members being coupled to the bottom of the bird feeder such that said platform is positioned below the bird feeder such that a bottom of the bird feeder is positioned above said central portion of said platform such that the platform is adapted for catching spilled bird seed from the bird feeder, said platform further being for positioning in parallel spaced relationship below the bird feeder such that the platform is adapted for permitting birds to visibly perch on the platform to use the spilled bird seed that has fallen from the bird feeder;

wherein said platform has a length defined between said ends of said platform, wherein said platform has a width defined between said sides of said platform, wherein said platform has a thickness defined between said faces of said platform;

wherein said width is about 15 inches, wherein said length is about 20 inches;

wherein said thickness is greater than 1 inch, wherein said thickness is about 1½ inches; and wherein said platform is suspended below a bird feeder a distance greater than about 7 inches.

* * * * *